Dec. 5, 1961 K. S. LION 3,012,192
ELECTRIC SYSTEM
Filed Aug. 18, 1958 5 Sheets-Sheet 1

INVENTOR.
Kurt S. Lion
BY Rines and Rines
ATTORNEYS

INVENTOR.
Kurt S. Lion
BY Rines and Rines
ATTORNEYS

INVENTOR.
Kurt S. Lion
BY Rines and Rines
ATTORNEYS

Dec. 5, 1961  K. S. LION  3,012,192
ELECTRIC SYSTEM

Filed Aug. 18, 1958  5 Sheets-Sheet 5

INVENTOR.
*Kurt S. Lion*
BY *Rines and Rines*
ATTORNEYS

United States Patent Office 3,012,192
Patented Dec. 5, 1961

3,012,192
ELECTRIC SYSTEM
Kurt S. Lion, 9 Herbert Road, Belmont, Mass.
Filed Aug. 18, 1958, Ser. No. 755,499
29 Claims. (Cl. 324—57)

The present invention relates to electric systems, and, more particularly, to systems embodying bridge-type circuits especially, though not exclusively, adapted for employment in the transducing of mechanical motions or other physical changes into electrical energy.

Alternating-current bridges have frequently been used as an auxiliary means for the measurement of a variety of physical magnitudes, including displacement, force, thickness, variation of dielectric constant, magnetic permeability and many other parameters or changes thereof. A transducer is commonly inserted in one or more branches of the bridge, the impedance of the transducer varying in response to a signal. As an illustration, the transducer may consist of a parallel-plate capacitor, the separation of the plates of which may change in response to a mechanical force, causing a variation of the capacitance and, in further sequence, an unbalance of the bridge, as described, for example, in my prior United States Letters Patent No. 2,800,622, issued July 23, 1957. In general, there are two methods for measuring the bridge unbalance; either equilibrium or balance is re-established by variation of the impedances in other branches or arms of the bridge, or the unbalanced output voltage is read or recorded to furnish a measure for the variation of impedance. In either case, however, difficulties arise from the fact that the indicating output device, which may consist of a direct-current meter with rectifier, generally exhibits a nonlinear characteristic, the sensitivity of which, expressed by the slope of the characteristic, is lowest in the vicinity of the balance ponit of the bridge, and increases, the further the bridge is off balance. If the bridge is operated as a balanced bridge, this makes the finding of the exact balance point difficult and prevents the use of interpolation methods to find the exact position of the same. If, on the other hand, the bridge is operated in unbalanced condition, a nonlinear relationship exists between the variation of the transducer capacitance or the like and the indication of the output indicating meter or other device; a condition which, for many practical applications, is undesirable or not acceptable.

This difficulty has long been recognized and many different proposals have been devised throughout the years to attempt to overcome the same. Included in such proposals is a bridge in which the A.C. voltage drops across the impedances of a pair of arms of the bridge are rectified as by two triodes, and the rectified D.C. voltages, or amplified values thereof, are compared in a meter or the like. The meter will indicate zero when the two D.C. voltages are alike, and the meter makes a deflection to the positive or to the negative side if one of these voltages is larger than the other. More recently, similar balanced detectors using transistors for the same purpose have been evolved. These prior-art circuits hav the common feature that the bridge consists of four linear impedances, and that the input impedances of the nonlinear rectifying elements are large compared with the impedances of the linear elements to which they are connected, so that the bridge currents are determined by the magnitude of the linear impedances and essentially not influenced by the nonlinear rectifying elements themselves.

It has been found that vastly improved operation can, however, be obtained, as later more fully explained, if the bridge currents are materially influenced by nonlinear rectifying elements; and it is an object of the present invention to provide a new and improved bridge comprising arms containing variable linear impedances and nonlinear rectifying elements.

A further object is to provide a new and improved transducer system involving such novel bridge.

Other and further objects will be explained hereinafter and will be more particularly pointed out in the appended claims.

The invention will now be described in connection with the accompanying drawing.

FIG. 1 of which is a schematic circuit diagram of a bridge constructed in accordance with the present invention;

Figure 1:
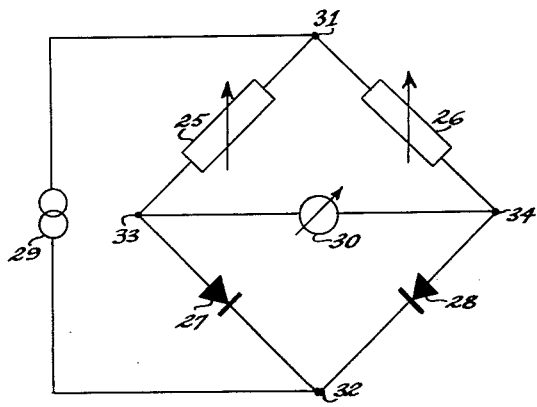

Referring to FIG. 1, two linear impedance elements 25 and 26 and two nonlinear rectifying elements 27 and 28 are shown connected in pairs of adjacent arms so as to form a bridge cricuit. An alternating-current source 29 is applied to the input terminals 31 and 32 at the upper and lower vertices of the bridge, and a D.C. meter or other indicating device 30 is connected to the output terminals 33 and 34, at the left- and right-hand vertices of the bridge. The term "alternating-current" or "A.C." source, as used herein, is intended to connote not only sine-wave generators or oscillators, but also square-wave and other pulse generators and the like; and the term "indicator" or "detector" and the schematic representation of a meter, to embrace any kind of indicating, recording or controlling circuit or device.

At least one of the linear impedances 25 and 26 of FIG. 1 is variable, as in response to a signal, as later described. With perfect balance conditions, when the impedance of the element 25 is equal to that of the element 26 and the voltage-current characteristics of the rectifiers 27 and 28 are alike, the indicator meter 30 will not indicate any current; but if either one of the two linear variable impedance elements 25 and 26 is varied, the meter 30 will register a deflection to the positive or to the negative side. It has been found that an arrangement of this type is not only much simpler and at least as stable as the previously described prior-art rectifying bridge systems, but that it also has a number of technical advantages later more fully treated. Different variations of this basic circuit, moreover, have advantages not to be attained with prior-art bridge constructions, as will also be shown hereafter.

Figure 2:
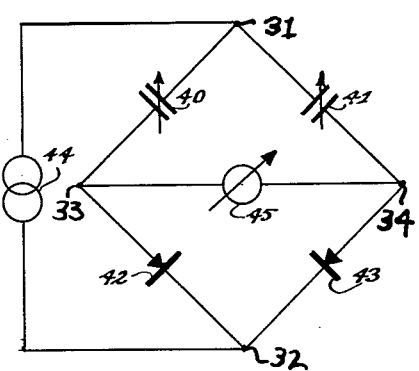
FIG. 2 is a similar diagram of a specific form of the bridge of FIG. 1 embodying variable capacitive impedance elements.
Figure 3:
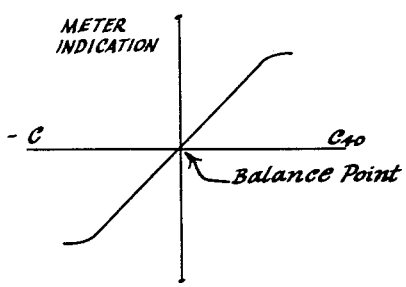
FIG. 3 is a graph indicating the balancing characteristic of the bridges of FIGS. 1 and 2.

A specific form of the bridge of FIG. 1 is illustrated in FIG. 2, embodying a pair of adjacent arms comprising capacitors 40 and 41, and a further pair of adjacent arms containing diodes 42 and 43. An A.C. source 44 is applied to the input vertices 31, 32, and a D.C. meter or other indicator 45 is inserted between the output vertices 33, 34. The transfer characteristic, defined as the deflection of the meter or other indicator 45 in response to a variation of one of the capacitances 40 or 41, is plotted in FIG. 3, meter deflection being indicated along the ordinate and capacitance variation, along the abscissa. It will be observed that at the point of zero balance, the slope of the characteristic is largest; demonstrating that the sensitivity at this balance point is very high. In addition, the characteristic is linear in this vicinity so that any capacitance variation of either of the elements 40 or 41 will cause a linear response of the meter deflection.

Figure 4:
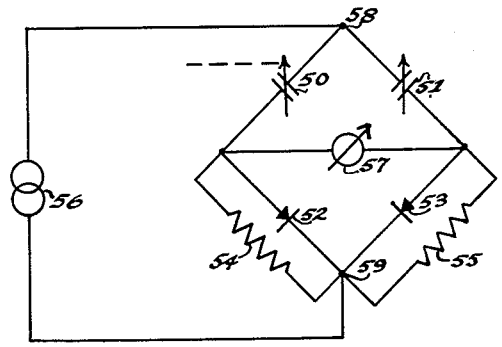
FIG. 4 is a diagram similar to FIG. 2 of a modification.

While the circuit of FIGS. 1 and 2 is basically satisfactory, certain refinements are necessary in order to obtain optimum response. The meter or other indicator 30 or 45 should preferably be a system of high input impedance, such as a vacuum-tube or high-input transistor voltmeter and the like. Since a D.C. current must pass through this meter, it can be seen that such a current must also pass through the internal impedance of the bridge system viewed as a four-terminal network. Such a current, however, cannot pass through the capacitances 40 and 41 of FIG. 2, but, rather must pass through the nonlinear rectifing diodes 42 and 43. Since these diodes 42, 43 are connected or poled in opposition, as shown, a current can only pass through them if either the back resistance of the diodes is sufficiently small, or if resistances or the like are connected in parallel with the diodes 42 and 43. The latter circumstance is illustrated in FIG. 4, wherein the oppositely connected diodes 52, 53 of the lower pair of adjacent bridge arms are shunted by respective resistances 54, 55. The arms of the upper pair of adjacent arms are shown containing capacitors 50 and 51, at least the capacitor 50 being variable, as in response to an external signal, schematically illustrated by the dotted gang connection thereto. The A.C. source is connected to the input upper and lower vertex terminals 58 and 59 of the bridge, and the meter or other indicator 57 is connected to the remaining left- and right-hand output vertex terminals. By means of the resistances 54 and 55, it is readily possible to correct for any difference in the characteristics of the diodes 52 and 53. It is, of course, to be understood that instead of the resistances 54 and 55, other direct-current-passing elements can be employed, such as inductances or other nonlinear networks, or combinations of linear with nonlinear networks.

For some applications, a feature of the circuits of FIGS. 2 and 4 may be somewhat disadvantageous. Only one of the meters or indicators, or the A.C. source can be grounded, but not both. As used herein, the term "ground" is intended to embrace not only actual earthing, but also other reference potential, such as chassis potential and the like. This, indeed, is a very common drawback in any kind of bridge, and there are a number of techniques for overcoming such a difficulty, including operating the source off ground but symmetrically with respect to ground, and grounding one pole of the indicator.

Figure 5:
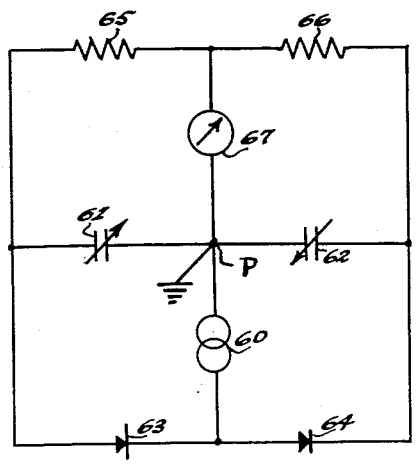
FIGS. 5 and 6 are further modifications of preferred grounded versions of the invention.

Another method employed in accordance with the present invention and which permits the simultaneous grounding of the input source, the measuring capacitances, and the output indicator or detector, is shown in the preferred embodiment of FIG. 5. One terminal of a source 60 (upper) is connected to the intermediate point P between the capacitance elements 61, 62, and is there grounded. Either one or both of the capacitors 61, 62 may be varied. One of the most frequently used forms is that whereby as capacitor 61 is increased, capacitor 62 is decreased, or vice versa; the capacitances forming a differential capacitor, in which the center plate is grounded at P. To the other terminal of the source 60 (lower), are connected the diodes 63 and 64, and a connection is made from one side of each diode through the respective resistances 65 and 66 to the meter or other indicator 67, which, again, may be a high-impedance instrument, such as a vacuum-tube voltmeter or a high-input transistor voltmeter and the like. This system is particularly useful in all those cases where the transducer must be at ground potential, and where one pole of the source as well as one pole of the indicator or detector is to be grounded. Any variation in the characteristics of the diodes 63 or 64 can be balanced in this instrument by variation of the relative values of the resistances 65 and 66, as discussed in connection with the circuit of FIG. 4. I have operated this circuit successfully despite differences in the characteristics of the diodes 63, 64, and have employed semi-conductor germanium diodes, silicon diodes, selenium diodes, copper-oxide diodes and thermionic diodes. The stability of this system is surprisingly large, and I have observed very little drift in these circuits.

Figure 6:
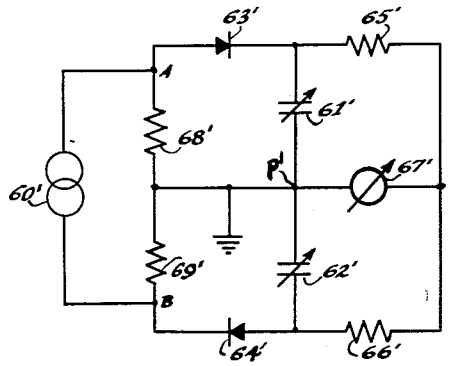

A modification of this circuit is shown in FIG. 6, similar components having the same reference numbers as in FIG. 5, but with a prime notation. The source 60' is applied across two resistances 68 and 69 which provide symmetrical voltage division. A center-grounded voltage source could, however, also be used. It should be noted that the potentials of points A and B, at the upper and lower terminals of the voltage divider 68, 69, are of opposite phase, but the direction of the diodes 63' and 64' is also of opposite sign. This has the advantage that any asymmetry of the wave shape supplied by the source 60' will not cause any difficulty in the bridge circuit. If such asymmetry exists, as, for example, if the generator 60' supplies pulses that are of different heights in the positive and negative phases, then the voltage dividers 68 and 69 will have the effect that one-half of the pulse height in, say, the positive direction, will be acting on both halves of the bridge; while, at a later time, one-half of the negative pulse will act on both sides of the bridge. If the two diodes 63' and 64' have equal characteristics, or if the difference in their characteristics is balanced out by adjustment of the resistors 65' and 66', as before explained, then no unbalance will be caused by an asymmetric supply voltage; and this, even though the bridge contains rectifiers.

Figure 7:
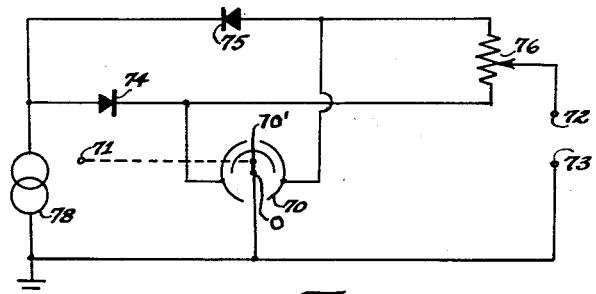
FIGS. 7 and 8 are circuit diagrams similar to FIG. 5 illustrating modified network components.

An application of the circuit of FIG. 5 for transducing purposes, such as the measurement of force or displacement, is shown in FIG. 7, it being understood that all of the circuits of the invention may be similarly applied. Strain, rotation, pressure, liquid level, flow velocity, humidity, sound or any other physical magnitude, which can cause a variation in impedance, may also be transduced. The two capacitance elements are replaced in FIG. 7 by the differential capacitor 70, having a grounded middle electrode 70'. A mechanical link 71 is connected from the outside to the center electrode 70' and moves this electrode angularly back and forth about the point O, increasing the capacitance on one side and decreasing that on the other side. The remainder of the circuit of FIG. 7 is analogous to that of FIG. 5, with two output terminals 72 and 73 being indicated in place of the output meter 67. The nonlinear rectifying diodes 74, 75 correspond to the diodes 63, 64 of FIG. 5; the source 78, to the source 60; and the potentiometer 76 to the resistances 65, 66. Any displacement of the center electrode 70' caused by movement of the mechanical link 71, causes a D.C. output signal to arise between the terminals 72 and 73. For moderate displacements of the center electrode, the output signal is proportional to the displacement of the same.

Several bridge types show a variation of the output voltage when the frequency of the supply A.C. source varies. The bridge system of the present invention, however, has been found to show remarkably little variation of the output voltage with frequency variation of the input voltage.

The output voltage that appears at the output terminals of any bridge circuit, moreover, varies with the magnitude of the input voltage, except at the condition of complete balance, where the output from such a bridge is zero. It is not possible, therefore, without further means, to distinguish whether the output voltage is the result of a variation of an impedance element of the bridge or of a variation of the input voltage. Variation of the output voltage resulting from variation of the input voltage, or supply voltage, is in many cases difficult to overcome. Voltage stabilized generators in the range of audio and radio frequencies are not very easily or simply constructed and require considerable means of instrumentation.

Figure 9:
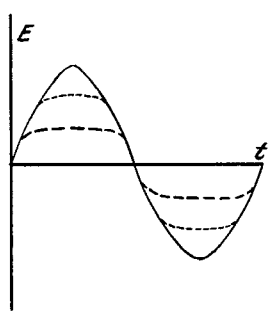
FIGS. 9 and 10 are graphs illustrating the clipping action and regulation of the circuit of FIG. 8.
Figure 8:
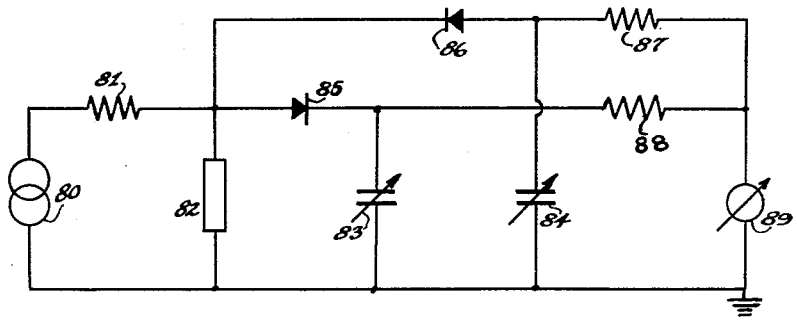

It has been found that these difficulties can be overcome very easily in the circuits of FIGS. 5, 6 and 7, and to a certain extent, also, in the embodiment of FIG. 4, merely by keeping the peak voltage applied to the bridge system substantially constant. This is simply done by inserting between the source and the bridge an element which is customarily used for the maintenance of a constant D.C. level, such as voltage regulator tubes of the glow-lamp type, Zener diodes, varistors, or similar devices. In FIG. 8, accordingly, the source 80 is connected through a resistor 81 to a constant-voltage element 82, such as a varistor. The varistor "clips" the voltage at a given value, depending upon the characteristic of the varistor, as is illustrated by the dotted wave-forms of FIG. 9, plotting voltage E as a function of time $t$. One would ordinarily assume that this clipping action would introduce higher harmonics which would, in turn, have to be balanced; so that the output becomes dependent not only upon the voltage that is applied but also upon the many higher harmonics thus originated. It is rather startling that this has been discovered not to be the case with the circuit of FIG. 8 or with the other embodiments of the invention. To the contrary, the output voltage remains very constant even if the input voltage varies. The output voltage is, therefore, primarily a function of the magnitude of the capacitances 83 and 84 of FIG. 8, and, to a first approximation, independent of the applied A.C. voltage from the source 80—82. The bridge-arm capacitors 83, 84; the rectifiers 85, 86; the resistances 87, 88; and the indicator 89, all correspond to the similar components of the earlier-discussed figures. I have operated this circuit successfully with a Zener diode combination in place of the varistor element 82, producing a symmetrical clipping of about 30 volts, and I have observed that the output voltage varies by less than one-half of one percent with a variation of the supply voltage from the source 80 of from 30 to 100 volts.

Figure 10:
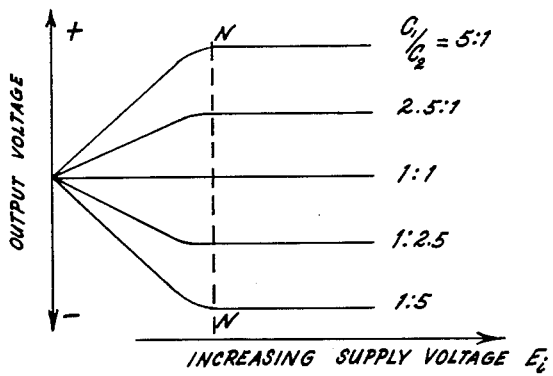

The experimentally observed response of the circuit of FIG. 8 is plotted in FIG. 10, the output voltage from the bridge being indicated along the ordinate, as function of the input supply voltage $E_i$ plotted along the abscissa. This output voltage is shown for different positions or values of the capacitors 83 ($C_1$) and 84 ($C_2$), such that the capacitance ratio thereof varies from a factor of $C_1/C_2=1:5$, to a factor 5:1. It is apparent that above a certain critical voltage indicated by the dotted line N—N, the output voltage does not vary as function of the applied input voltage $E_i$, but depends, rather, only upon the relative value of the capacitors 83 and 84. This is a characteristic which can be termed almost ideal because it provides a bridge that is very sensitive with respect to small variations in the impedance of the bridge arms, but is insensitive with respect to variations of the input voltage $E_i$ from the source 80.

It is, of course, not necessary to restrict the operation of the bridge to the range above the line N—N. The bridge can also be operated, without the benefit of the regulation mechanism by operating it at voltages below the line N—N. This is particularly the case if a modulated output from the bridge is desired. It is, of course, also possible to operate this bridge system with square-wave pulses at the input, rather than with clipped sine waves. Such an arrangement is even more profitable since it is possible, with very little effort and with very modest means, to build a square-wave generator, and neither voltage or frequency stability is very critical. If such a square-wave generator is used as the source 80 at the input of the bridge, it makes no difference whether the Zener diode or the like 82, is placed at the input to, or at the output of, the square-wave generator.

Of particular advantage in these constructions is the presence of the resistances 87 and 88, or the corresponding resistors in FIGS. 7, 8, and 9. As pointed out above, with these resistors it is possible to balance any variation of the characteristics of the diodes 85 and 86. It is, therefore, not necessary to select these diodes very carefully in order to match them. Existent, not-too-large, variations of their characteristics can easily be compensated by an appropriate adjustment of the relative values of the resistances 87 and 88, either with appropriately selected fixed resistance elements or with potentiometer controls as at 76 in the circuit of FIG. 7. Such an adjustment is very easily made by making the capacitance of 83 equal to 84 and then adjusting the resistances 87 or 88, or both, in such a way that the output meter 89 does not show any deflection. Even outside of the balance position, the meter will then show a linearity of the deflection in response to any variation of 83 or 84, or both.

Figure 11:
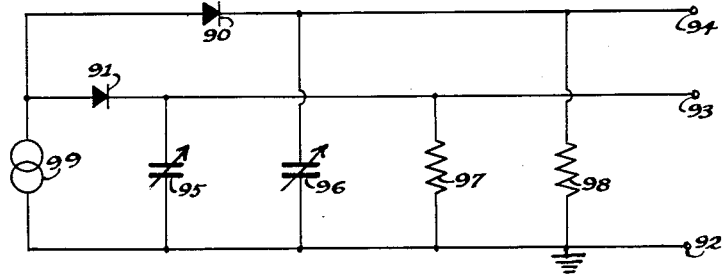
FIGS. 11, 12, 13 and 14 are similar diagrams of still further modified bridges adapted for push-pull outputs.

The output from the bridge circuits of FIGS. 5, 6, 7 and 8 is single-end grounded, the meter or indicator having one terminal grounded. Frequently, however, it is desirable to have a balanced, or push-pull output. In this case, a circuit of the type illustrated in FIG. 11 may be employed, the circuit being, in principle, identical with those of FIGS. 5, 7 and 8. It can be seen, however, that both diodes 90 and 91 are connected in the same directions, as distinguished from the reverse-direction connections of FIGS. 5, 7 and 8. There is thus produced at the output terminals 93 and 94, a voltage that is symmetrical with respect to ground. A push-pull or balanced amplifier or detector can then be connected to the terminals 93 and 94 and the ground or neutral connection of such a detector may be connected to the terminal 92. Capacitors 95 and 96, the source 99, and resistances 97 and 98 serve the functions before described in connection with the corresponding elements of the other embodiments of the invention. D.C. voltages of several-volts magnitude may, however, exist between terminals 93 and 92, or 94 and 92, respectively, but such voltages can be compensated for, as is well known.

Figure 12:
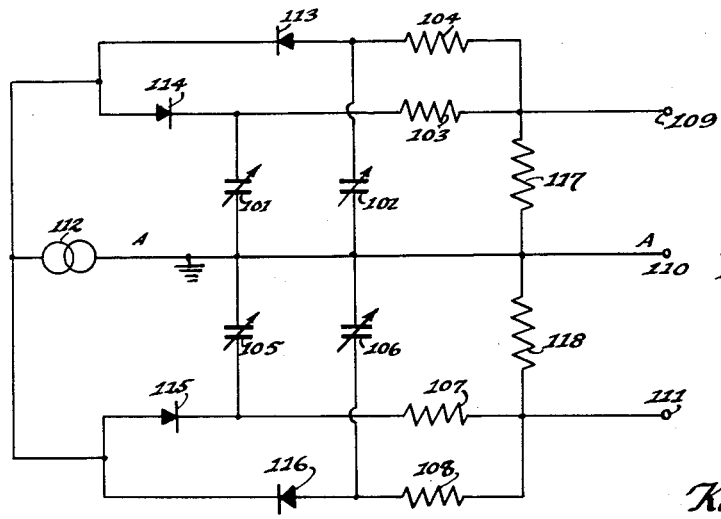

A completely different arrangement that also affords a differential output, whereby at bridge balance, all output terminals are at ground potential, is shown in FIG. 12. This bridge consists of two bridge systems, each of which is a duplication of that shown in FIGS. 5 or 7, having respective pairs of nonlinear rectifying arms 113, 114 and 115, 116, and a common source 112. The parts above and below the symmetry line A—A are alike. The upper and lower parts can be adjusted to zero by means of the capacitances 101, 102 and 105, 106, respectively, and the resistances 103, 104 and 107, 108, respectively. When completely balanced, there will be no voltage between the respective output terminals 109, 110 and 111, 110. Resistors 117 and 118 are connected, respectively, between output terminals 109, 110 and 111, 110. If either the ratio of the capacitances 101:102 is changed, or, preferably, the ratio of the capacitances 101:105, then the potential of the terminal 109 will, say, diminish, while that of the terminal 111 will increase symmetrically with respect to zero. The output is, therefore, completely grounded in the center and always symmetrical with respect to zero.

Figure 13:
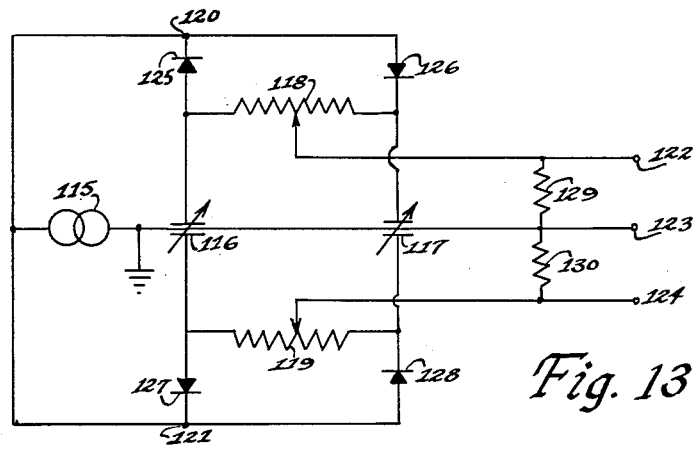

The circuit of FIG. 12 is redrawn in FIG. 13 with preferred modified components. The capacitances 101, 105 and 102, 106 of FIG. 12 are shown in FIG. 13 as differential capacitors 116 and 117, respectively; the resistances 103, 104 and 107, 108 of FIG. 12 are illustrated as potentiometers 118 and 119 in FIG. 13; and the source 115, output resistors 129, 130 and output terminals 122, 123 and 124, 123 of FIG. 13 correspond to the source 112, the output resistors 117, 118, and the output terminals 109, 110 and 111, 110 of FIG. 12, respectively. The right-hand terminal of the source 115 is grounded, while the high-voltage or left-hand terminal thereof is applied to the bridge vertex points 120 and 121.

Figure 14:
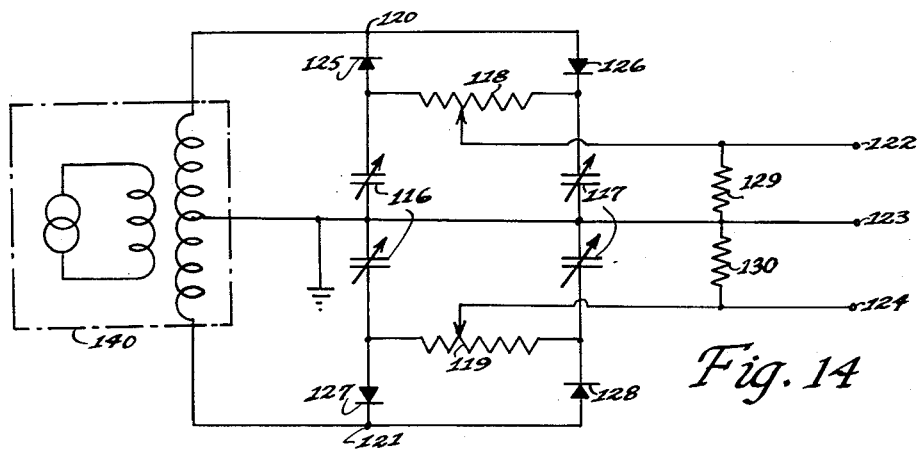

It is, however, not necessary that a single-ended grounded oscillator or other source 115 be used for this type of circuit. A source 140 that is center-grounded may also be employed, as shown in FIG. 14. The circuit is otherwise the same as that of FIG. 13.

In all of the embodiments of FIGS. 12, 13 and 14, furthermore, the variable capacitors are connected in such a way that one point of all four capacitors is connected to ground. This is a particular advantage of this embodiment, since most transducers are grounded at one point and can thus easily be used in this circuit. It will also be observed that capacitors 101, 102, 105 and 106 of FIG. 12, and the corresponding capacitors of FIGS. 13 and 14, permit an output voltage to appear at the terminals 109 and 111 of FIG. 12, and at the terminals 122 and 124 of FIGS. 13 and 14, that can result from a combination variation of these capacitances. An increase of capacitances 101 and 106 of FIG. 12, for instance, will produce an output voltage that is proportional to the sum of the displacements of capacitors 101 and 106. Similarly, the output will also vary in response to variations in capacitors 105 and 102, and the output will, therefore, depend upon the sum of difference of different displacements acting upon the respective capacitances.

Figure 15:
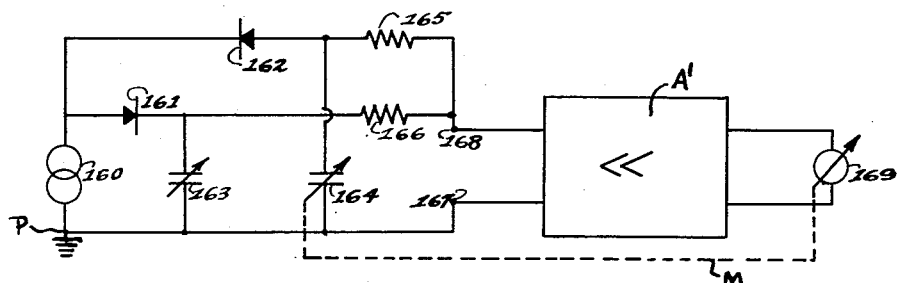
FIG. 15 is a diagram similar to FIG. 5 of the bridge as used in a feed-back control system.

The rectifier bridge circuit of the present invention also lends itself particularly well to feedback operation. An example of such an application, which, again, may be applied to all of the other embodiments of the invention, is shown in FIG. 15, the basic circuit of which is the same as that shown in FIGS. 5 or 7. The bridge of FIG. 15 contains an A.C. source 160, diodes 161 and 162, capacitors 163 and 164, and resistors 165 and 166. One point P of the source 160 of the capacitors 163, 164 and of the output terminal 167, is grounded. The output terminals 167 and 168 are connected to a high-gain amplifier A; which controls a motor or servo-control 169. The motor 169 is mechanically connected at M to the capacitor 164. If, in response to a mechanical or other signal, the capacitor 163 is changed, a voltage will appear at the output terminals 167 and 168 which will be amplified and will cause a movement of the output system 169. The output system, in turn, will change the position of the capacitor 164 until equilibrium is again obtained. The arrangement shown here is particularly advantageous because the force required to change the capacitance 164 is very small, and, in many cases, is negligible. An ordinary moving coil system 169 may be sufficient, indeed, to accomplish the changes in the capacitance 164.

Figure 16:
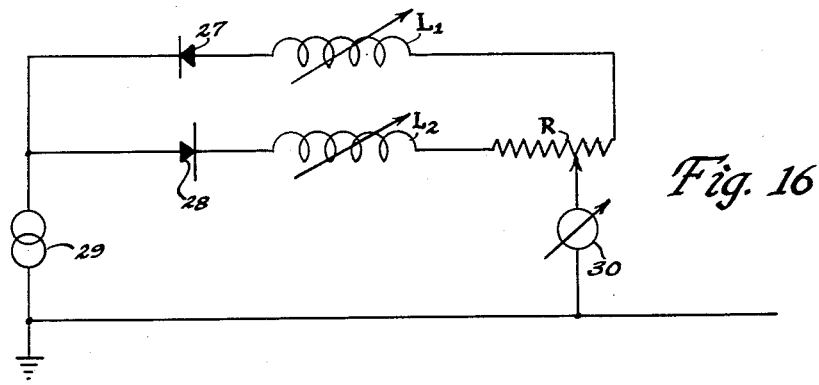
FIG. 16 represents a further modified bridge embodying inductive elements.

While capacitive elements have been illustrated and described, other variable impedance elements may also be used in all of the embodiments of the invention. In FIG. 16, for example, the rectifiers 27, 28 of FIG. 1 are shown connected with adjacent bridge arms comprising inductors $L_1$ and $L_2$, and with the compensating potentiometer R.

It is to be understood that triode rectifiers can also be used in all of the above-described circuits instead of diodes, as may other similar nonlinear elements performing the same function. Since the arrangement is symmetrical, problems of temperature compensation are, in many cases, nonexistent. The present invention lends itself particularly well to telemetering operations because the capacitances, the diodes and the resistances are so small that they may be compactly packaged together, and the only requirement is a connection from the source to the system and from the system to the output meter or indicator. The invention lends itself, also, to telemetering systems using radio-frequency transmissions, whereby the radio-frequency source employed for sending out signals, may be the same as that used as the supply voltage source to operate the bridge.

Figure 17:
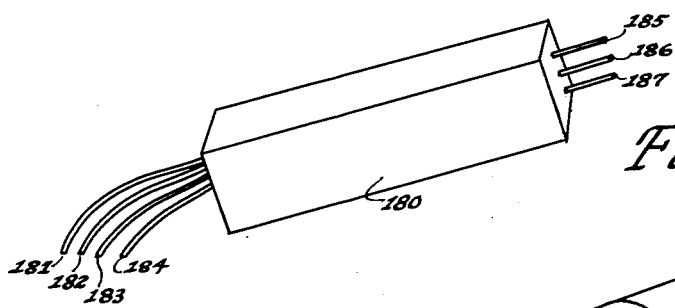
FIGS. 17 and 18 are perspective views of packaged units containing the circuits of the present invention.

The simplicity of the bridge networks and the associated equipment, plus the fact that the relatively simple oscillators and other circuits employed offer a high degree of stability and accuracy in connection with the described systems, make it possible to build relatively small and compact instruments for reliable measurements. FIG. 17 shows an example of such an instrument. The oscillator or A.C. source, the bridge network, and any amplifier that may be used, are mounted within a small container 180. Two wires 181 and 182 conduct the supply voltage from, say, a battery to the oscillator and the amplifier, if used, and two other wires 183 and 184 lead the output signal to a meter or other indicator circuit or device. At the other end of the container are three contacts 185, 186 and 187, insulated from each other, and to which, for example, a variable differential capacitor, such as the capacitor 70 in FIG. 7, can be connected. A unit of the type shown in FIG. 17 can can be used as a standard construction element, like a vacuum tube, in a great number of applications where a magnitude to be measured, recorded, or controlled can be made to the variation of a capacitor or other impedance element.

Figure 18:
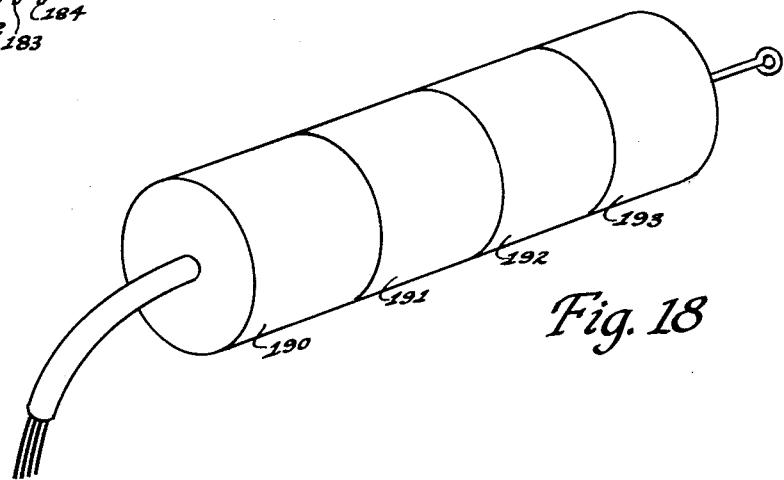

A similar packaged system is shown in FIG. 18. The different parts of the bridge combination—i.e. the A.C. oscillator, generator or source 190; an amplifier 191; the bridge network 192; and the variable capacitor or other system 193—are each imbedded or otherwise held in a small cylindrical container, and the different containers may be screwed together, or otherwise joined, for any desired application.

In the bridge circuits of the present invention, moreover, which are adapted for transducer operation as distinguished from other types of rectifier bridges, such as those adapted for use in entirely different operation as power-supply rectifiers, and the like, the time constants of the capacitance arm-output circuit system (such as the product of the capacitance 40 of FIG. 2 and the resistance of the indicator 45), is not very large compared to the period of the input source frequency; but, rather, may be comparable therewith, though it may be somewhat larger. In power-supply bridge rectifiers, on the other hand, it is essential that such time constants be very large compared with the period of the source frequency in order to provide the required ripple-free operation. As an example, supplementary to the previously described illustrations, with a 400-kilocycle source 80, FIG. 8, of 12 volts (R.M.S.) output; 1N626 silicon diodes 85, 86 of approximately 375 ohms forward resistance and approximately 1.75 megohms reverse-direction resistance; values of capacitances 83 and 84 of the order of 10 $\mu\mu$farads; substantially equal resistances 87, 88 of the order of 25K; and an output load at 89 of approximately 10 megohms; output voltages of the order of 77 millivolts per micromicrofarad capacitance change, have been obtained. It was found that the lower the value of the load impedance 89, the higher the output voltage per micromicrofarad of change. Thus, with a low impedance load of 15,000 ohms, the same capacitance change produced a voltage of 110 millivolts for these particular circuit values. The lower the value of load impedance and the higher the values of capacitances 83 and 84, moreover, the more linear the operation was found to be over the entire range.

Further modifications will also occur to those skilled in the art and all such are considered to fall within the spirit and scope of the invention as defined in the appended claims.

What is claimed is:

1. An electric system for converting a change in a substantially linear impedance to a corresponding voltage having, in combination, a multi-arm network provided with a pair of input and a pair of output terminals, means for applying an alternating-current voltage to the input terminals, an output circuit for feeding a direct-current output voltage from the output terminals, a first pair of adjacent arms of the network connected in circuit with the input and output terminals and each containing a non-linear rectifying element, a second pair of adjacent arms of the network disposed oppositely to and connected with the first pair of arms and each containing a substantially linear energy-storage impedance element, and means for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

2. An electric system for converting a change in a substantially linear impedance to a corresponding voltage having, in combination, a multi-arm network provided with a pair of input and a pair of output terminals, means for applying an alternating-current voltage to the input terminals, an output circuit for feeding a direct-current output voltage from the output terminals, a first pair of adjacent arms of the network connected in circuit with the input and output terminals and each containing a nonlinear rectifying element, a second pair of adjacent arms of the network disposed oppositely to and connected with the first pair of arms and each containing a substantially capacitive energy-storage impedance element, and means for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

3. An electric system for converting a change in a substantially linear impedance to a corresponding voltage having, in combination, a multi-arm network provided with a pair of input and a pair of output terminals, means for applying an alternating-current voltage to the input terminals, an output circuit for feeding a direct-current output voltage from the output terminals, a first pair of adjacent arms of the network connected in circuit with the input and output terminals and each containing a nonlinear rectifying element, a second pair of adjacent arms of the network disposed oppositely to and connected with the first pair of arms and each containing a substantially linear capacitive energy-storage impedance element differentially arranged with respect to one another, and means for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

4. An electric system for converting a change in a substantially linear impedance to a corresponding voltage having, in combination, a multi-arm network provided with a pair of input and a pair of output terminals, means for applying an alternating-current voltage to the input terminals, an output circuit for feeding a direct-current output voltage from the output terminals, a first pair of adjacent arms of the network connected in circuit with the input and output terminals and each containing a non-linear rectifying element, a second pair of adjacent arms of the network disposed oppositely to and connected with the first pair of arms and each containing a substantially linear inductive energy-storage impedance element, and means for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

5. An electric system for converting a change in a substantially linear impedance to a corresponding voltage having, in combination, a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a non-linear rectifying element, direct-current impedance elements shunting the nonlinear rectifying elements, a second pair of adjacent arms of the bridge disposed oppositely to and connected with the first pair of arms and each containing a substantially linear energy-storage impedance element, and means for varying the impedance of at least one of the linear-impedance arms, the time constants of each of the pair of circuits traceable from the said alternating - current - voltage - applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating - current - voltage - applying means, thereby to develop direct-current voltages across each of the energy-storage elements that may be relatively varied in response to the said impedance-varying means and provide a differential direct-current voltage between the said output terminals.

6. An electric system for converting a change in a substantially linear impedance to a corresponding voltage having, in combination, a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a nonlinear rectifying element, direct-current impedance, elements shunting the nonlinear rectifying elements, a second pair of adjacent arms of the bridge disposed oppositely to and connected with the first pair of arms and each containing a substantially linear energy-storage impedance element, and means for varying the impedance of at least one of the linear-impedance arms the alternating-current voltage-applying means having a common grounded terminal with each of the substantially linear-impedance arms and the output circuit, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

7. An electric system for converting a change in a substantially linear impedance to a corresponding push-pull voltage having, in combination, a pair of multi-arm bridges, each provided with a pair of input and a pair of output terminals, means for applying an alternating-current voltage to the input terminals, an output circuit for feeding a direct-current output voltage from the output terminals, a first pair of adjacent arms of each bridge connected in circuit with the corresponding input and output terminals and each containing a nonlinear rectifying element, a second pair of adjacent arms of each bridge disposed oppositely to and connected with the first pair of arms and each containing a substantially linear impedance element; and means for varying the impedance of at least one of the linear-impedance arms of each bridge; one of the output terminals of each of the pair of bridges being common and connected with a common terminal of each of the linear-impedance arms and of the alternating-current voltage-applying means.

8. An electric system as claimed in claim 7 and in which direct-current impedance elements are provided shunting each of the nonlinear rectifying elements.

9. An electric system for converting a signal-controlled change in a substantially linear impedance to a corresponding voltage having, in combination a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a nonlinear rectifying element, a second pair of adjacent arms of the bridge disposed oppositely to and connected with the first pair of arms and each containing a substantially linear energy-storage impedance element, and means responsive to a signal-to-be-detected for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

10. An electric system for converting a signal-controlled change in a substantially linear impedance to a corresponding voltage having, in combination, a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a nonlinear rectifying element, a second pair of adjacent arms of the bridge disposed oppositely to and connected with the first pair of arms and each containing a substantially linear capacitive energy-storage impedance element, and means responsive to a signal-to-be-detected for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

11. An electric system for converting a signal-controlled change in a substantially linear impedance to a corresponding voltage having, in combination, a multi-arm bridge provided with a pair of input and a pair of output terminals, means for applying an alternating current voltage to the input terminals, an output circuit for feeding a direct-current output voltage from the output terminals, a first pair of adjacent arms of the bridge connected in circuit with the input and output terminals and each containing a nonlinear rectifying element, a second pair of adjacent arms of the bridge disposed oppositely to and connected with the first pair of arms and each containing substantially linear capacitive energy-storage impedance element differentially arranged with respect to one another, and means responsive to a signal-to-be-detected for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

12. An electric system for converting a signal-controlled change in a substantially linear impedance to a corresponding voltage having, in combination a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a nonlinear rectifying element, a second pair of adjacent arms of the bridge disposed oppositely to and connected with the first pair of arms and each containing a substantially linear inductive energy-storage impedance element, and means responsive to a signal-to-be-dectected for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

13. An electric system as claimed in claim 9 and in which the nonlinear rectifying elements comprise substantially similar semi-conductor rectifiers.

14. An electric system for converting a signal-controlled change in a substantially linear impedance to a corresponding voltage having, in combination, a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a nonlinear rectifying element, direct-current impedance elements shunting the nonlinear rectifying elements, a second pair of adjacent arms of the bridge disposed oppositely to and connected with the first pair of arms and each containing a substantially linear energy-storage impedance element, and means responsive to a signal-to-be-detected for varying the impedance of at least one of the linear-impedance arms, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

15. An electric system for converting a signal-controlled change in a substantially linear impedance to a corresponding voltage having, in combination, a multi-arm bridge provided with a pair of input and a pair of output terminals, means for applying an alternating-current voltage to the input terminals, an output circuit for feeding a direct-current output voltage from the output terminals, a first pair of adjacent arms of the bridge connected in circuit with the input and output terminals and each containing a nonlinear rectifying element, direct-current impedance elements shunting the nonlinear rectifying elements, a second pair of adjacent arms of the bridge disposed oppositely to and connected with the first pair of arms and each containing a substantially linear energy-storage impedance element, and means responsive to a signal-to-be-detected for varying the impedance of at least one of the linear-impedance arms, the alternating-current voltage-applying means having a common grounded terminal with each of the substantially linear-impedance arms and the output circuit, the time constants of each of the pair of circuits traceable from the said alternating-current-voltage-applying means through each of the said substantially linear energy-storage impedance elements of the second pair of adjacent network arms to the said output terminals being of value comparable to the period of the said alternating-current voltage, in order that the said energy-storage impedance elements may store and discharge energy at the frequency of the alternating-current-voltage-applying means, thereby to develop direct-current voltages across each of the energy-storage elements that may be relatively varied in response to the said impedance-varying means and provide a differential direct-current voltage between the said output terminals.

16. An electric system for converting a signal-controlled change in a substantially linear impedance to a corresponding push-pull voltage having, in combination, a pair of multi-arm bridges, each provided with a pair of input and a pair of output terminals, means for applying an alternating-current voltage to the input terminals, an output circuit for feeding a direct-current output voltage from the output terminals, a first pair of adjacent arms of each bridge connected in circuit with the corresponding input and output terminals and each containing a nonlinear rectifying element, a second pair of adjacent arms of each bridge disposed oppositely to and connected with the first pair of arms and each containing a substantially linear impedance element; and means responsive to a signal-to-be-detected for varying the impedance of at least one of the linear-impedance arms; one of the output terminals of each of the pair of bridges being common and connected with a common terminal of each of the linear-impedance arms and of the alternating-current voltage-applying means.

17. An electric system as claimed in claim 16 and in which direct-current impedance elements are provided shunting each of the nonlinear rectifying elements.

18. An electric system as claimed in claim 16 and in which the nonlinear rectifying elements comprise substantially similar semi-conductor rectifiers.

19. An electric system as claimed in claim 1 and in which the nonlinear rectifying elements comprise semi-conductor rectifiers.

20. An electric system as claimed in claim 19 and in which the rectifiers are oppositely poled.

21. An electric system as claimed in claim 19 and in which the rectifiers are similarly poled.

22. An electric system as claimed in claim 1 and in which the said alternating-current voltage-applying means includes a radio-frequency source.

23. An electric system as claimed in claim 1 and in which the said alternating-current voltage-applying means includes a substantially square-wave pulse generator.

24. An electric system as claimed in claim 9 and in which the said signal-responsive means is connected to the output circuit and then back to the said one linear-impedance arm.

25. An electric system as claimed in claim 9 and in which one of the said pair of input terminals is connected between the non-linear rectifying elements of the first pair of adjacent arms, with the rectifying elements connected in opposite polarity.

26. An electric system as claimed in claim 9 and in which one of the said pair of input terminals is connected between the non-linear rectifying elements of the first pair of adjacent arms, with the rectifying elements connected in the same polarity.

27. An electric system as claimed in claim 9 and in which there are provided a pair of common points of connection of an arm of each pair of adjacent arms, and resistive means is inserted in circuit between each common point and one of the said output terminals.

28. An electric system as claimed in claim 27 and in which the said resistive means is adjustable relatively to vary the resistance between each said common point of connection and the corresponding said output terminal.

29. An electric system as claimed in claim 9 and in which there is connected across the said input terminals peak-voltage clipping means.

References Cited in the file of this patent

UNITED STATES PATENTS

| | | |
|---|---|---|
| 2,126,790 | Logan | Aug. 16, 1938 |
| 2,203,485 | Bently | June 4, 1940 |
| 2,508,446 | Conant | May 23, 1950 |
| 2,715,718 | Holtje | Aug. 16, 1955 |

(Other references on following page)

UNITED STATES PATENTS

| | | |
|---|---|---|
| 2,728,042 | Ruhland | Dec. 20, 1955 |
| 2,766,428 | Sippach | Oct. 9, 1956 |
| 2,820,194 | Reinartz | Jan. 14, 1958 |

FOREIGN PATENTS

| | | |
|---|---|---|
| 961,339 | France | May 10, 1950 |
| 862,800 | Germany | Jan. 12, 1953 |
| 1,052,717 | France | Sept. 23, 1953 |

OTHER REFERENCES

Holtje et al.: General Radio Experimenter, volume 30, No. 11, April 1956, pages 1–7.

Jurgen: Electronics, volume 31, No. 27, July 14, 1958, pages 59–70.